Oct. 11, 1949.　　　　K. L. HERTEL　　　　2,484,507
CONTROLLING FLUID FLOW THROUGH
RESTRICTED CONDUITS
Filed April 3, 1944　　　　　　　　　　　　4 Sheets-Sheet 1
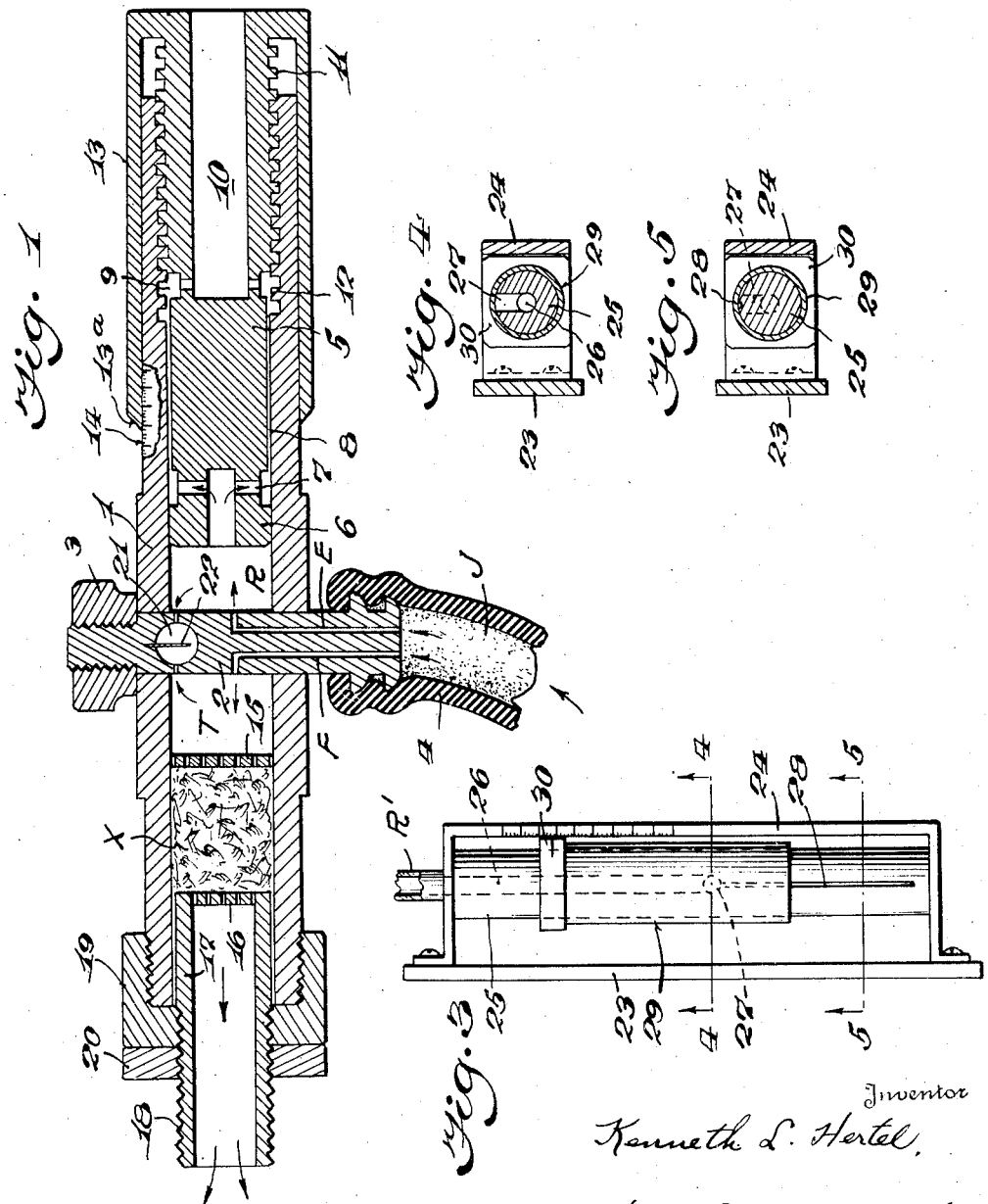
Inventor
Kenneth L. Hertel,
By Stone, Boyden & Mack,
Attorneys

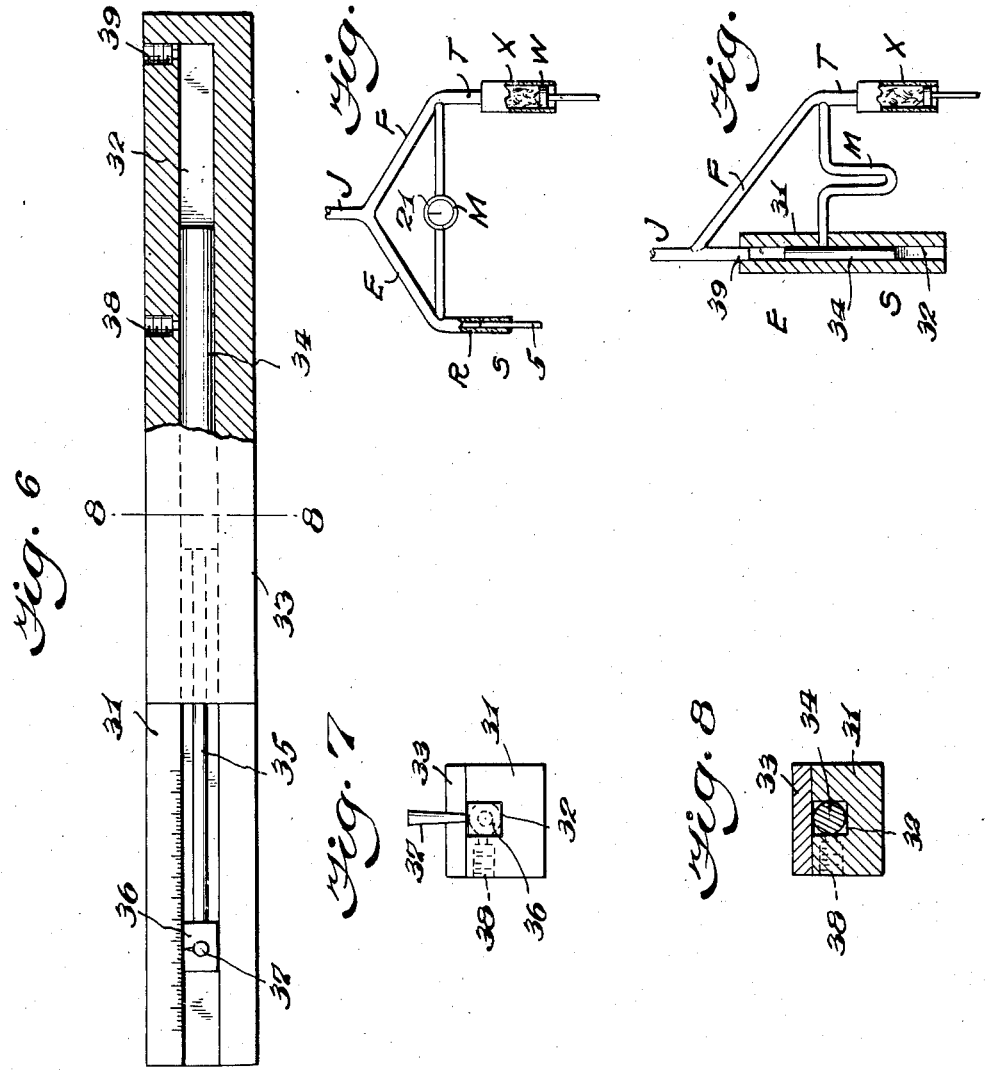

Oct. 11, 1949.
K. L. HERTEL
2,484,507
CONTROLLING FLUID FLOW THROUGH
RESTRICTED CONDUITS
Filed April 3, 1944
4 Sheets-Sheet 3
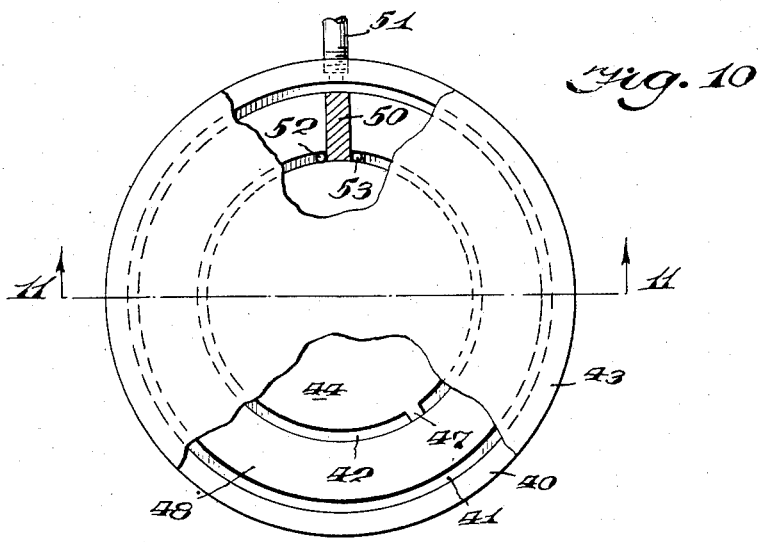
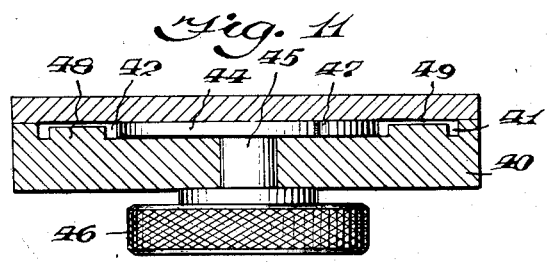
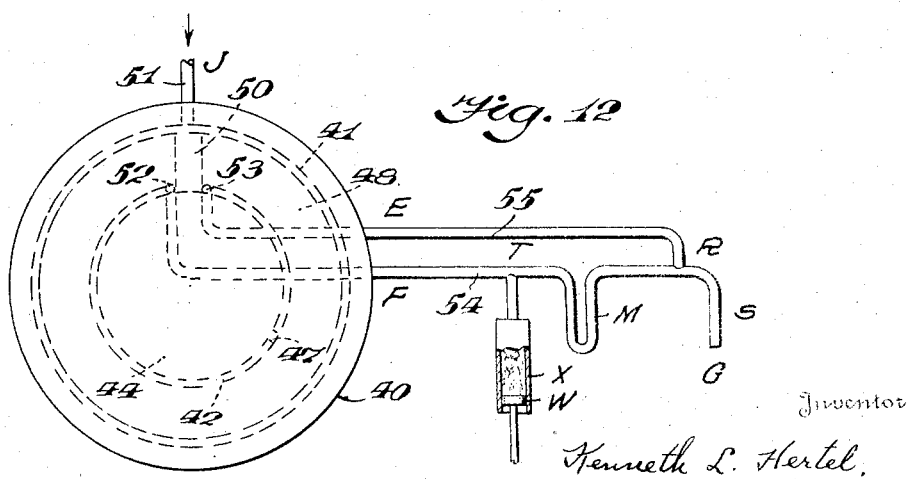
Inventor
Kenneth L. Hertel,
By Stone, Boyden & Mack,
Attorneys

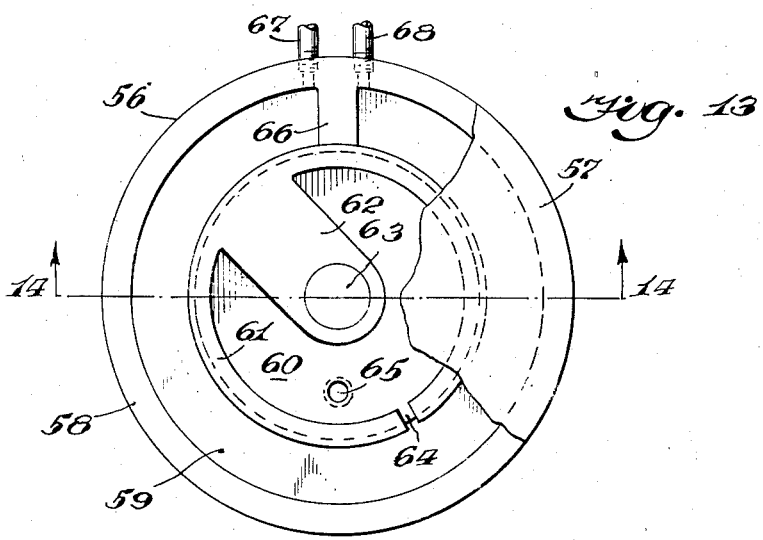
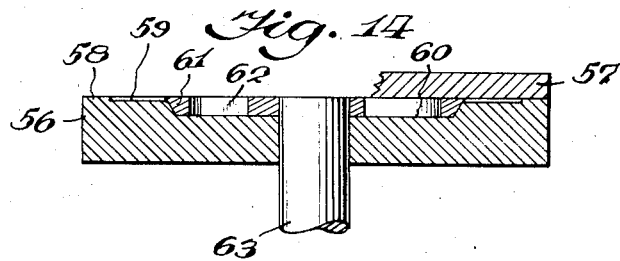
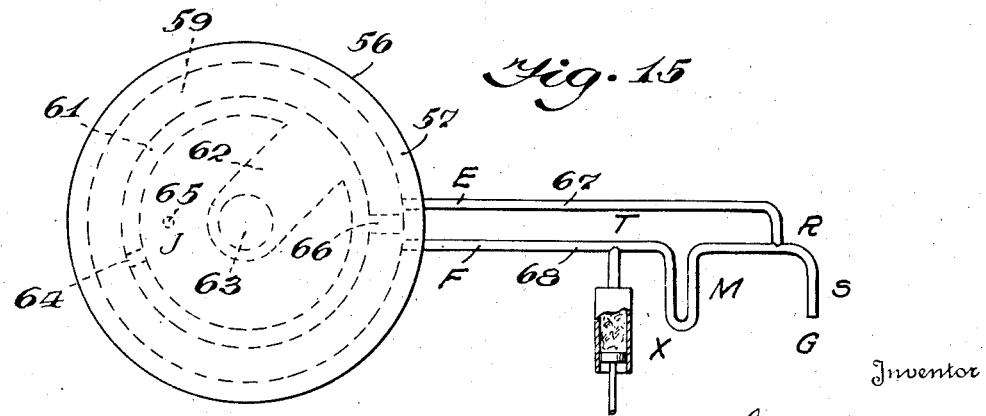

Patented Oct. 11, 1949

2,484,507

UNITED STATES PATENT OFFICE 2,484,507

CONTROLLING FLUID FLOW THROUGH RESTRICTED CONDUITS

Kenneth L. Hertel, Knoxville, Tenn., assignor to University of Tennessee Research Corporation, Knoxville, Tenn., a corporation of Tennessee Application April 3, 1944, Serial No. 529,352

10 Claims. (Cl. 73—38)

This invention relates to conduits designed to offer relatively high resistance to the flow of fluid therethrough, and more particularly to means for varying such resistance, as desired.

The present application is a continuation in part of my prior co-pending application, S. N. 294,727, filed September 13, 1939, now Patent No. 2,352,835, issued July 4, 1944.

An object of the invention is to provide a conduit having a restricted portion and so constructed that the length of such restricted portion may be readily adjusted and the resistance which it offers to fluid flow thus varied.

Although, in its broader aspects, the invention is not limited to such use, it has special utility when embodied in apparatus comprising conduits arranged to form the arms of a Wheatstone bridge, for the purpose of determining the relative resistance to fluid flow of a sample of porous material, as set forth in my said prior application.

When so employed, another object of the invention is to provide improved means by which the length of the restricted conduits forming two arms of the bridge may be simultaneously and oppositely adjusted, thus varying their resistance relative to each other. In this way, the necessity for the accurate adjustment of a single arm to an absolute value is eliminated, and mechanical imperfections which might in that case result in serious error, become unimportant, since the only thing to be determined is the relative resistance of the two arms, rather than the actual resistance of either arm alone.

In order that the invention may be readily understood, reference is had to the accompanying drawings forming part of this specification, and in which:

Fig. 1 is a longitudinal section showing one form of the invention as embodied in a Wheatstone bridge arrangement designed for the measurement of the relative resistance to fluid flow offered by a sample of porous material.

Fig. 2 is a diagrammatic view illustrating the principle of operation of the device shown in Fig. 1.

Fig. 3 is a side elevation showing another construction for varying the length of a restricted conduit.

Fig. 4 is a transverse section on the line 4—4 thereof, looking in the direction of the arrows.

Fig. 5 is a section on the line 5—5 of Fig. 3, looking in the direction of the arrows.

Fig. 6 is a plan view partially in section showing still another embodiment of the invention and illustrating means by which the restricted portions of two adjacent conduits may be simultaneously and oppositely adjusted.

Fig. 7 is an end elevation of the device shown in Fig. 6.

Fig. 8 is a transverse section on the line 8—8 of Fig. 6.

Fig. 9 is a diagrammatic view similar to Fig. 2, but showing how the device illustrated in Figs. 6–8 may be connected in a Wheatstone bridge arrangement.

Fig. 10 is a plan view, parts being broken away, showing still another embodiment of the invention having means by which the restricted portions of two adjacent conduits may be simultaneously and oppositely adjusted.

Fig. 11 is a transverse section on the line 11—11 of Fig. 10, looking in the direction of the arrows.

Fig. 12 is a diagrammatic view showing how the device illustrated in Figs. 10 and 11 may be connected to form a Wheatstone bridge arrangement.

Fig. 13 is a plan view, parts being broken away, showing yet another modified construction of means for simultaneously and oppositely varying the restricted portions of two adjacent conduits.

Fig. 14 is a transverse section on the line 14—14 of Fig. 13, looking in the direction of the arrows, and Fig. 15 is a diagrammatic view showing how the device illustrated in Figs. 13 and 14 may be connected in a Wheatstone bridge arrangement.

In the following description, in order to make clear the relation of the present invention to that of my prior co-pending application, above identified, I have employed many of the same reference letters which appear in Fig. 1 of said application. These reference letters indicate corresponding parts in the two applications.

Referring to the drawings in detail and more particularly first to Fig. 1 thereof, the device as illustrated comprises an elongated tubular body 1, having a plug or partition 2 extending transversely through the middle portion thereof and secured in position by means of a nut 3.

To the other end of this plug is secured a rubber tube 4 extending from a pump or other source of air pressure. Communicating with the tube 4 and extending longitudinally through the end portion of the plug 2 are a pair of restricted conduits or passageways E and F, having their ends arranged to discharge into the interior of the tube 1 at opposite sides of the plug or partition 2.

Loosely fitting the interior of the tube 1 at one side of the partition 2 is a plunger 5, having at its inner end a pilot piston 6 closely fitting the interior of the tube and formed with passages 7 communicating with the narrow annular space 8 between the plunger and the interior of the tube. It will be understood that this narrow annular space constitutes a restricted conduit or passageway, and that the resistance which it offers to the flow of fluid depends upon its length.

The length of this restricted passageway can be varied as desired by moving the plunger 5 axially of the tube so that it is caused to enter the tube to a greater or less extent. For the purpose of thus moving the plunger axially, its outer end is formed with screw threads 11 adapted to engage similar threads on the inner surface of the tubular body 1. This outer threaded portion of the plunger element is provided with a longitudinal bore 10, open at its outer end and communicating at its inner end through ports 9 with the restricted passageway 8.

It will be seen that, in the position of the parts illustrated in Fig. 1, the restricted passageway 8 is of approximately its maximum length. When it is desired to decrease this length, and thus decrease the resistance which the passageway offers to the flow of fluid, the plunger element is unscrewed, thus withdrawing the plunger proper from the tube to a greater or less extent and causing it to project from the outer end thereof into the region occupied by the threads 12. It is clear that the restricted passageway 8 terminates at the threads 12 since, when fluid reaches such threads, it is discharged through the ports 9 into the bore 10 and thus freely escapes.

In the preferred construction, a sleeve 13 is secured to the outer end of the plunger element and encloses the tubular body 1. This not only affords a ready means by which the plunger element may be turned and thus adjusted as desired, but the inner edge 13a of the sleeve, which may be appropriately beveled, constitutes an index adapted to co-operate with a graduated scale on the surface 14 of the tubular body. By reading this scale, the exact position of the plunger 5 within the tube may be determined.

At the opposite side of the partition 2 from the plunger 5 is set a perforated wall 15, and at the extreme end of the tube is a second perforated wall 16 carried by a nipple 17 provided with threads 18 engaging a screw cap 19 and held in position by means of a lock nut 20.

The porous material to be tested is confined between the two porous walls 15 and 16 and, in accordance with my said prior co-pending application, is herein designated X. While this sample to be tested may, as indicated in the drawing, consist of a mass of fibrous material, such as raw cotton, the invention is by no means limited to this, since the apparatus lends itself equally well to the testing of granular material such as sand, geological specimens, and even sheet material, such as cloth or paper.

Between the partition 2 and piston 6 is a chamber designated R and between the partition 2 and the perforated wall 15 is a second chamber designated T. The restricted conduits E and F discharge respectively into the chambers R and T.

Within the partition 2 is a chamber 21 in which is mounted a thin strip 22 of suitable, flexible material, such as metal leaf or foil, this strip being freely suspended from its upper end. On opposite sides of this strip are small ports establishing communication between the chamber 21 and the chambers R and T respectively.

By reference to Fig. 2, it will be seen that the restricted conduits E and F constitute two arms of a Wheatstone bridge arrangement, while the other two arms consist of the sample X to be tested and the restricted conduit designated S, the length and resistance of which can be varied by means of the plunger 5. The device 21, 22 described is designated M in Fig. 2, and corresponds with the manometer shown in my said prior co-pending application. Also, in accordance with said application, the sample of porous material is shown as confined by means of a piston W, which in fact corresponds to the perforated wall 16 of Fig. 1.

Assuming that the restricted conduits E and F constituting two arms of the bridge are equal, then it follows that the resistance of the sample X is equal to the resistance of the arm S, when the bridge is balanced. The balancing of the bridge is of course indicated when the strip 22 remains vertical and is not deflected to either side. In other words, the bridge is balanced when the pressures in the chambers R and T are equal. The bridge is of course balanced by adjusting the plunger 5 by turning the sleeve 13, and when balanced, the figure read from the scale on the surface 14 of Fig. 1 indicates the relative resistance to fluid flow offered by the sample X.

In Figs. 3, 4 and 5, I have shown another construction embodying a restricted conduit of variable length. In these figures, 23 designates a suitable base to which is secured a bracket 24 carrying a cylindrical bar 25. This bar has a longitudinal bore 26 communicating with a radial port 27, the outer end of the bore 26 being connected with a conduit R' which corresponds to the chamber R in Fig. 1.

Formed in the surface of the bar 25 is a longitudinally extending groove 28, and slidably mounted on the bar is a closely fitting sleeve 29, having an enlargement 30 at one end. It will be seen that this sleeve, at the points where it overlies the groove 28, forms therewith a restricted conduit, and that the length of this conduit may be varied by shifting the sleeve lengthwise of the bar. An index carried by the enlarged portion 30 cooperates with the scale on the bracket 24 to indicate the length, and hence the resistance, of the restricted conduit. When connected in Wheatstone bridge arrangement this restricted conduit corresponds with the arms S shown in Fig. 2.

While I have illustrated the sleeve 29 as being movable, and the bar 25 fixed, it is obvious that the sleeve may be fixed and the bar movable.

In Figs. 6, 7 and 8, I have illustrated a further modified construction of means for varying the length of a restricted conduit, and this modification is designed especially for incorporation in a Wheatstone bridge arrangement in such a manner that the lengths of the restricted conduits forming two adjacent arms of the bridge may be simultaneously and oppositely varied.

The device illustrated in these figures comprises an elongated body 31, having a channel 32 extending throughout the length thereof, this channel being closed at the right-hand end. The channel is shown as of square cross section and in this channel is placed a cylindrical plunger 34, capable of sliding longitudinally therein. The plunger 34 is adapted to be moved by means of a rod 35 connected at its outer end to a head 36 carrying a handle 37. A cover member 33 extends for a part of the length of the body 34 and overlies and closes that portion of the channel 32 in which the plunger 34 operates.

It will be understood that by virtue of the fact that the plunger 34 is cylindrical, and is enclosed within a square channel, the small spaces remaining in the corners of the square channel constitute a restricted conduit or passageway through which fluid may flow. Pipe connections 38 and 39 are provided, as shown in Fig. 6, one at the extreme closed end of the channel and the other at a point substantially midway of the range of movement of the plunger.

In Fig. 9, I have illustrated how this device may be connected in a Wheatstone bridge arrangement. Referring to this, Figure J represents the source of fluid pressure and this is connected to the point 39, while a restricted conduit F of constant resistance is also connected to J.

The channel 32, containing the plunger 34, constitutes two arms of the bridge, namely those designated E and S, and the meeting point of these two arms is connected to one side of the pressure indicator or manometer M, the other side of which is connected at T to the meeting point between the arms F and X. From this it is obvious that as the plunger 34 is moved longitudinally of the channel 32, it varies the lengths of the restricted conduits constituting the arms E and S simultaneously and oppositely. That is to say, as the length of the arm E is decreased, the length of the arm S is increased, and vice versa. Since the arm F is of fixed resistance, the relation which this arm bears to the resistance of the sample X, when the bridge is balanced, is determined by the ratio between the lengths, and consequently the resistances of the two arms E and S and this relation may be read from a scale formed on the body 31 by means of an index carried by the head 36 as shown in Fig. 6.

In Figs. 10 and 11, I have shown another modified construction, and in this the restricted conduits of variable length are arcuate, instead of being straight, as in the preceding figures.

The device comprises a circular block 40 having formed in one face thereof an annular groove 41, near the periphery and a central circular depression 42. A cover plate 43 of the same diameter as the block 40 overlies the groove 41 and depression 42.

Disposed within the depression 42 and mounted to rotate on a shaft 45 journalled in the block 40 is a disc 44, of somewhat smaller diameter than the depression 42, so that an annular channel is formed around the edge of this disc. This channel however is closed at one point by a lug 47 which projects radially from the disc 44 into engagement with the wall of the depression 42. The disc 44 may be rotated by means of a knob 46, so as to bring the lug 47 into any desired angular position.

Between the depression 42 and the annular groove 41 is an annular rib 48, but, as shown in Fig. 11, this terminates slightly below the under surface of the cover 43 so as to leave between itself and this cover a very restricted thin passageway 49.

At one point however an abutment 50 is provided which does engage the under surface of the cover and thus blocks the space 49 at this point. This abutment also extends into the depression 42 so as to snugly engage the periphery of the disc 44. A pipe 51 communicates with the annular groove 41 and ports 52 and 53 extend from the bottom of the depression 42 through the block 40 at each side of the abutment 50.

It will be seen that fluid entering the pipe 51 will pass immediately into the groove 41 and thence will flow radially inward through the thin space 49 to the channel surrounding the disc 44, and from this channel it will escape through the ports 52 and 53. It will be noted however that only the fluid passing through that portion of space 49, which is to the right of the lug 47 as viewed in Fig. 10, can find its way to the port 53, the remaining fluid flowing out through port 52. It will be understood that by means of the knob 46 the angular position of the lug 47 can be adjusted as desired so as to divide the flow of fluid from groove 41 to the ports 52 and 53 in any proportion desired. It will be further understood that the flow of fluid through the groove 41 and the channel surrounding the disc 44, as well as through the ports 52 and 53, should be relatively free, while the passageway 49 is extremely thin and constitutes a restriction which offers substantial resistance to the flow.

The method in which the device shown in Figs. 10 and 11 can be connected in a Wheatstone bridge arrangement is illustrated diagrammatically in Fig. 12, in which corresponding reference characters have been used, as well as the reference letters employed in the previous diagrams.

In this arrangement S constitutes the arm of the bridge which is of fixed resistance, and this may consist of a capillary tube, such as shown in my said prior co-pending application. This opens to atmosphere at G. The pressure indicating device or manometer M is connected between the points R and T, as before. The arms E and F of the bridge are variable. These comprise the pipes 54 and 55, extending from the ports 52 and 53 to the points T and R respectively, which pipes offer no appreciable resistance, as well as the restricted conduits or passageways provided by the thin space 49.

It will be observed that when the disc 44 is turned so as to vary the position of the lug 47, the lengths of those portions of the annular space 49 between the lug 47 and the respective ports 52 and 53 are varied simultaneously and oppositely, that is to say, one is increased while the other is decreased. Since these annular spaces constitute parts of the arms E and F, it is clear that the resistances of these arms are simultaneously and oppositely varied.

In Figs. 13 and 14, I have shown still another modified construction of means for simultaneously and oppositely varying the lengths of two adjacent restricted conduits. In this modification also the restricted conduits are arcuate.

This device comprises a circular block 56 and a cover plate 57 of the same diameter, fitting thereon.

Formed in one face of the block 56 is a very shallow annular passageway 59 surrounding a relatively deep central depression 60. The annular passageway 59 is surrounded by a peripheral flange or rim 58.

Snugly fitting within the depression 60 is a ring 61, the meeting edges of the ring and depression preferably being beveled as shown. This ring is of such thickness as to extend above the bottom of the annular groove 59, and so that its upper surface is flush with the surface of the rim 58. Thus the cover 57 seats upon the rim 58 and ring 61 and forms with the groove 59 a restricted annular passageway.

The ring 61 is carried by an arm 62, secured to a shaft 63 rotatably mounted in the block 56. The ring 61 is split or divided, having a small gap 64 at one point, preferably substantially opposite the arm 62. A port 65 extends from the depression 60 through to the bottom of the block, and an abutment 66, the upper surface of which is flush with that of the rim 58 and the inner end of which snugly engages the ring 61, interrupts the annular passageway 59 at one point. Pipes 67 and 68 communicate with the passageway 59 at opposite sides of the abutment 66.

The method in which the apparatus just described can be connected in a Wheatstone bridge arrangement is diagrammatically illustrated in Fig. 15. This is very similar to Fig. 12 and carries the same reference letters. The pipes 67 and 68 are connected to the points R and T and constitute a part of the arms E and F, while the restricted portions of these arms are provided by the annular passageway 59. Fluid under pressure is supplied to the inlet port 65, which corresponds to the pipe J of Figs. 2 and 9. Fluid entering this port passes through the gap 64 in the ring 61 into the annular restricted passageway 59. It will be observed that the fluid issuing from the gap 64 divides, part flowing in one direction to pipe 67 and part flowing in the other direction to pipe 68. By turning the shaft 63 the gap 64 may be adjusted to any desired angular position and the ratio between the lengths of the portions of the annular passageway 59 between this gap and the pipes 67 and 68 varied as required. Here, as in the preceding figures, it will be noted that the lengths of these portions of the annular passageway 59 are simultaneously and oppositely varied, that is to say, one is increased as the other is decreased, and consequently the resistances of the arms E and F of the bridge are similarly varied.

It may be explained that in Fig. 12 the flow through the restricted passageway is radial, so that the longer the passageway, the less the resistance, while in Fig. 15 the flow through the restricted passageway is circumferential, so that the longer the passageway, the greater the resistance.

From the foregoing it will be seen that I have provided a number of modified forms of construction of devices for varying the resistance to fluid flow offered by a restricted conduit, but the same principle is found in all of them, namely varying the resistance by adjusting the length of the restricted conduit. Similarly, as to Figs. 6–15, inclusive, while some show adjustment in a straight line and others show arcuate adjustment, they all embody the same principle of operation, namely the simultaneous and opposite variation of the resistance offered by two adjacent conduits meeting at a common point, such for example as two adjacent arms of a Wheatstone bridge.

Where, in the specification and claims I use the terms "tube" and "tubular," it will be understood that these terms are intended to include closed elongated chambers whether round, polygonal, or other shape in cross section, and whether of the same or progressively varying diameter throughout their length.

What I claim is:

1. The combination with a conduit, open at both ends, of another conduit joining the same at an angle thereto, and a plunger loosely fitting said first conduit and extending past the junction point with said other conduit, whereby the parts of said first conduit occupied by said plunger on either side of said junction constitute restricted portions, said plunger being movable so as to simultaneously and oppositely vary the lengths of said restricted portions.

2. The combination with two conduits, each having an arcuate restricted portion, said portions meeting at a common point, of means for simultaneously and oppositely varying the lengths of said arcuate restricted portions.

3. The combination with two conduits, each having an arcuate restricted portion, said portions meeting at a common point, of rotary means for equally and oppositely varying the lengths of said arcuate restricted portions.

4. The combination with two conduits, each having an arcuate restricted portion, said arcuate restricted portions being disposed end to end to form a partial annulus, of means mounted to rotate about the center of said annulus for reversely varying the lengths of the respective arcuate portions.

5. The combination with a pair of conduits having between them a common annular restricted passageway, interrupted at one point, means for delivering fluid under pressure to said passageway so that it flows to both conduits, and means for varying at will the angular position of the point of delivery relative to said point of interruption.

6. Apparatus for determining the relative resistance to fluid flow offered by a sample of porous material comprising a plurality of fluid conduits connected to form the four arms of a bridge, each offering a substantial resistance to fluid flow and one being constructed to contain said sample, means for causing a current of fluid to flow simultaneously through both sides of said bridge, movable unitary means for simultaneously and oppositely adjusting the resistance to fluid flow offered by two adjacent arms of the bridge other than that containing the sample until a condition of balance is obtained, and pressure responsive means for indicating when such balanced condition exists.

7. The combination with four fluid conduits arranged to form the arms of a bridge, two of said conduits having restricted portions meeting at a common point, means for causing a current of fluid to flow simultaneously through both sides of the bridge, means for simultaneously and oppositely adjusting the length of said respective restricted portions to vary their relative resistance to fluid flow so as to balance the bridge, and means for indicating when such balanced condition exists.

8. The combination with four fluid conduits arranged to form the arms of a bridge, two of said conduits having restricted portions meeting at a common point, means for causing a current of fluid to flow simultaneously through both sides of the bridge, a single movable means for simultaneously and oppositely adjusting the length of said respective restricted portions to vary their relative resistance to fluid flow so as to balance the bridge, and means for indicating when such balanced condition exists.

9. Apparatus for determining the relative resistance to fluid flow offered by a sample of porous material comprising a plurality of fluid conduits connected to form the four arms of a bridge, each offering a substantial resistance to fluid flow and one being constructed to contain said sample, means for causing a current of fluid to flow simultaneously through both sides of said bridge, a movably mounted element associated with two adjacent arms of the bridge other than that containing the sample, said element being so constructed that, when moved, it serves to increase the resistance to fluid flow offered by one of said arms and to simultaneously decrease the resistance offered by the other, and means for indicating when the pressures existing at the junction points of the pairs of arms at the opposite sides of the bridge are equal.

10. The combination with four fluid conduits arranged to form the arms of a bridge, two of said conduits having restricted portions meeting at a common point, means for causing a current of fluid to flow simultaneously through both sides of the bridge, a movably mounted element associated with said restricted portions and so arranged that, when moved, it serves to increase the length of one of said restricted portions, and to simultaneously decrease the length of the other, to vary their relative resistance to fluid flow, and fluid pressure responsive means connected between said common point and the junction of the other two arms of the bridge.

KENNETH L. HERTEL.

REFERENCES CITED

The following references are of record in the file of this patent:

UNITED STATES PATENTS

| Number | Name | Date |
| --- | --- | --- |
| 1,152,127 | Stackpole | Aug. 31, 1915 |
| 1,487,989 | Vose | Mar. 25, 1924 |
| 1,836,682 | Ray | Dec. 15, 1931 |
| 1,871,287 | Whittaker | Aug. 9, 1932 |
| 1,913,149 | Atwater | June 6, 1933 |
| 1,926,413 | Tibbs | Sept. 12, 1933 |
| 2,003,949 | Morgan et al. | June 4, 1935 |
| 2,277,760 | Hoffman et al. | Mar. 31, 1942 |
| 2,350,058 | May | May 30, 1944 |
| 2,352,835 | Hertel | July 4, 1944 |

FOREIGN PATENTS

| Number | Country | Date |
| --- | --- | --- |
| 191,677 | Switzerland | Sept. 16, 1937 |